US012606215B2

(12) United States Patent
Bauer et al.

(10) Patent No.: US 12,606,215 B2
(45) Date of Patent: Apr. 21, 2026

(54) TAKEOVER OF VEHICLE CONTROL

(71) Applicant: Ford Global Technologies, LLC, Dearborn, MI (US)

(72) Inventors: Daniel Bauer, Berlin (DE); Peter W. A. Zegelaar, Heerlen (NL); Guido Weitkus, Cologne (DE); Andreas Puetz, Kelmis (BE); Patrick Piastowski, Herne (DE); Benjamin Maus, Düsseldorf (DE)

(73) Assignee: Ford Global Technologies, LLC, Dearborn, MI (US)

(*) Notice: Subject to any disclaimer, the term of this patent is extended or adjusted under 35 U.S.C. 154(b) by 524 days.

(21) Appl. No.: 17/533,167

(22) Filed: Nov. 23, 2021

(65) Prior Publication Data

US 2022/0169289 A1 Jun. 2, 2022

(30) Foreign Application Priority Data

Nov. 27, 2020 (DE) .......................... 102020214999.2

(51) Int. Cl.
| | |
|---|---|
| *B60W 60/00* | (2020.01) |
| *B60W 40/09* | (2012.01) |
| *B60W 50/14* | (2020.01) |

(52) U.S. Cl.
CPC ........ *B60W 60/0053* (2020.02); *B60W 40/09* (2013.01); *B60W 50/14* (2013.01); *B60W 60/0059* (2020.02); *B60W 2050/146* (2013.01)

(58) Field of Classification Search
CPC .. B60W 40/09; B60W 50/14; B60W 60/0059; B60W 2050/146; B60W 60/005; B60W 60/0053; G05D 1/0061
See application file for complete search history.

(56) References Cited

U.S. PATENT DOCUMENTS

| | | | | |
|---|---|---|---|---|
| 9,063,543 | B2 | 6/2015 | An et al. | |
| 10,118,628 | B2 | 11/2018 | Lundsgaard | |
| 10,635,102 | B2 | 4/2020 | Ryne et al. | |
| 2016/0347327 | A1* | 12/2016 | Kondo .................. | B60W 50/08 |
| 2017/0300052 | A1* | 10/2017 | Harda .................. | B60W 40/04 |
| 2018/0072315 | A1* | 3/2018 | Enthaler .............. | B60W 30/10 |
| 2018/0237027 | A1* | 8/2018 | Lundsgaard ...... | B60W 50/0098 |
| 2019/0322291 | A1* | 10/2019 | Tsuda .................. | B60W 50/14 |

(Continued)

FOREIGN PATENT DOCUMENTS

| | | |
|---|---|---|
| DE | 102015013319 A1 | 4/2017 |
| DE | 102015226442 A1 | 6/2017 |

(Continued)

OTHER PUBLICATIONS

German Search Report for application DE 02020214999.2 as issued by the German Patent Office on Apr. 22, 2021 (in German).

*Primary Examiner* — Khoi H Tran

*Assistant Examiner* — Dairon Estevez

(74) *Attorney, Agent, or Firm* — Frank A. MacKenzie; Brooks Kushman P.C.

(57) ABSTRACT

Practicing a takeover of vehicle control of a vehicle 100 from an autonomous mode includes generating a takeover command for performing the takeover of the vehicle control without the existence of a reason for a takeover, and outputting the takeover command to a driver of the vehicle, wherein information about the non-existence of a reason for takeover is not output to the driver.

8 Claims, 2 Drawing Sheets

(56) References Cited

U.S. PATENT DOCUMENTS

| | | | |
|---|---|---|---|
| 2019/0344790 A1* | 11/2019 | Kitagawa | ................. G08G 1/16 |
| 2021/0155268 A1* | 5/2021 | Oba | ....................... B60K 35/25 |
| 2022/0161813 A1* | 5/2022 | Oba | ................. B60W 60/0053 |

FOREIGN PATENT DOCUMENTS

| | | | |
|---|---|---|---|
| DE | 102018111016 A1 | 11/2019 |
| WO | 2019082774 A1 | 5/2019 |

* cited by examiner

TAKEOVER OF VEHICLE CONTROL

CROSS-REFERENCE TO RELATED APPLICATIONS

This patent application claims priority to German Patent Application No. 102020214999.2, filed Nov. 27, 2020, which is hereby incorporated by reference in its entirety.

BACKGROUND

Driver assistance systems make it possible to relieve a driver of a vehicle of some, and in the future possibly all, driving tasks. The vehicle may thus be configured to be partially autonomous or fully autonomous, wherein a division into different autonomy levels, for example, from autonomy level 0, in which the driver performs all activities independently, to autonomy level 5, in which the vehicle performs all activities itself, may be provided.

Conditional automation is provided for in autonomy level 3. This means that the driver does not have to monitor the vehicle and the driving environment continuously, but that the vehicle can independently perform operations such as triggering the turn signal, changing lanes, and lane keeping. The driver is able to do other things, but if necessary, is prompted by the vehicle to take over driving within a warning period, i.e., to return from an autonomous mode to a manual mode. For example, it may be provided that the vehicle drives autonomously only under certain conditions, for example, in a definable geographical area, under certain weather conditions, as a function of the traffic volume, etc.

This may result in the driver being prompted to take control of the vehicle, for example, when weather conditions change, when leaving a definable geographical area, etc., or in the event of a failure of vehicle systems, for example, sensors for monitoring the vehicle's environment. Some of these takeover scenarios can be scheduled, for example, based on the vehicle's driving route, so that the driver can be forewarned in a timely manner. Other takeover scenarios, for example, in the event of a vehicle system failure, cannot be scheduled and require immediate intervention by the driver with little or no advance warning.

In general, three potential issues may be identified. First, a driver may not have experience in taking control of the vehicle. Second, most takeovers are scheduled takeovers which have corresponding advance warning. Third, a driver's attention span may decrease as the duration of the autonomous mode progresses.

In order to reduce potential issues associated with the takeover, U.S. Pat. No. 10,118,628 B2 proposes a method which makes it possible for a driver to practice a takeover and certain driving situations without the support of driver assistance systems. The practice session may be initiated either by the driver or by a computer system. The practice session may be linked to an evaluation of the driver's actions, which may also be taken into account in subsequent practice sessions. By means of practice, the driver's driving skills can be improved despite an increase in the use of autonomous vehicle functions.

U.S. Pat. No. 10,635,102 B2 discloses testing methods for testing the driver's re-engagement in the driving process, i.e., takeover.

However, a disadvantage of the proposed methods may be that the driver is informed about the upcoming test at the beginning. This may result in the driver reacting differently in the case of a practice session than he or she would in an actual driving maneuver. In particular, a sudden takeover cannot be practiced with the proposed methods.

In addition, U.S. Pat. No. 9,063,543 B2 discloses a method in which a driving route to be completed is divided into segments, and it is determined for these segments whether they are to be driven autonomously or manually. A driver risk index is thereby determined and taken into account.

WO 2019/082 774 A1 also discloses a method which provides for dividing a driving route to be completed into segments which are to be driven autonomously, and segments which are to be driven manually. Further subdivision is also possible.

SUMMARY

The present disclosure describes practicing driving maneuvers, and a system with which such a method can be carried out. The present disclosure relates to a method and a system for practicing a takeover of vehicle control of a vehicle from an autonomous mode, and also relates to a vehicle, a computer program, and a computer-readable data storage medium.

A first aspect of the present disclosure relates to a method for practicing a manual takeover of vehicle control of a vehicle from an autonomous mode. The method comprises generating a takeover command, without a reason for a takeover existing, for performing the takeover of the vehicle control by the driver, i.e., so the driver can manually operate the vehicle, and outputting the takeover command to a driver of the vehicle, wherein information about the non-existence of a reason for takeover is not output to the driver.

The method may be computer-implemented.

A vehicle may be understood to be any mobile means of transport, i.e., a ground vehicle, for example, a passenger car, as well as a watercraft or aircraft. The vehicle can be operated in an autonomous mode. In the autonomous mode, the vehicle can independently carry out functions for the entire driving process, thus eliminating the need for control by the driver.

The vehicle may in particular be a vehicle of autonomy level 3, in which the conditional automation explained at the beginning is provided. Manual takeover (or "takeover" by the driver) means that the driver takes over functions for the entire vehicle, so that the vehicle is operated in a manual mode, i.e., by the driver, following the takeover.

As also explained at the beginning, the takeover may be provided in various takeover scenarios if one or more reasons for takeover exist which require a transition from the autonomous mode to the manual mode with or without advance warning. Possible reasons for takeover include, for example, leaving a geographical area in which autonomous driving is allowed, changing weather conditions, failure of vehicle systems, for example, sensors, etc.

If such a takeover scenario exists, a takeover command is generated by the vehicle and output to the driver in order to effect a takeover. The existence of a takeover scenario can usually be determined with the aid of sensor signals which are received and processed by a control unit.

On the other hand, "practicing a takeover" means that none of these takeover scenarios actually exists, but that a takeover command is generated and output without an external or vehicle-related cause, i.e., for practice purposes. Thus, the takeover command is generated without the existence of a reason for takeover.

The generated takeover command is then output to the driver, for example, by means of an acoustic, visual, and/or haptic signal. Here, it is provided that no information about the non-existence of a reason for takeover is output to the driver. In other words, the driver is not informed that it is a practice session.

The proposed method allows practicing the takeover of the vehicle control under conditions which are particularly realistic, since the driver cannot distinguish between a practice session and a real takeover scenario. In addition, this may cause the driver to complete the practice session with a higher level of attention, since it could also be a real takeover scenario. The processes associated with the take-over may thus be practiced in a better, i.e., more realistic, manner.

Overall, the stress of real takeover scenarios may be reduced, since the driver is highly familiar with the manual takeover due to practice. In addition, the incorporation of one or more practice sessions may bring about improved driver attention even during long periods of an autonomous mode, since driver interaction becomes necessary from time to time.

According to various embodiment variants, the method may comprise identification of an autonomously drivable section of a driving route of the vehicle, subdivision of the autonomously drivable section into subsections, and deter-mination of a current position of the vehicle along the driving route, wherein the takeover command is output upon reaching the next subsection.

For example, the takeover command may be output solely as a function of reaching the next subsection, i.e., indepen-dently of the existence of other conditions.

In other words, a takeover for practice purposes may be provided after completing a predefinable driving distance or driving time. As a result, on the one hand, it becomes possible to enable regular practice, and on the other hand, a variety of situations in which a takeover may occur may be practiced, since the practice is not performed as a function of the occurrence of a specific situation, for example, only when there is little traffic, during daylight, etc., but prefer-ably solely as a function of the driving distance or driving time on the already-completed driving route.

The subsections may be formed in a distance-related or time-related manner. For example, the autonomously driv-able section may be subdivided into subsections of equal length, wherein "of equal length" may be defined as an equal route length or an equal driving time.

In order to be able to reduce predictability of the next practice session, it may be provided that the takeover command is output randomly within a predefinable distance window or time window before and after reaching the next subsection. As a result, it is possible to enhance the desired training effect.

The number of subsections may be determined, for example, based on the length of the autonomously drivable section and a predefinable minimum length of a subsection. In other words, a minimum distance between two directly successive takeover commands may be provided for practice purposes. As a result, practicing which is too frequent and which is possibly accompanied by practice fatigue for the driver may be avoided.

In an embodiment, a new subsection may begin after each predefined minimum length. In further embodiments, a number of takeovers to be performed may first be deter-mined based on the length of the autonomously drivable section and the minimum length of a subsection. The deter-mined number, which is usually is not a natural number, may then be rounded up or down. The autonomously drivable section may then be divided into subsections of equal length according to the rounded-up or rounded-down number.

According to further embodiment variants, the method may comprise a determination and evaluation of a driver's performance during the takeover.

In other words, it is possible to determine how well or poorly the driver has responded to the takeover command. For this purpose, a driver profile may be created in which data from several practice sessions are collected and linked to the person of the driver, wherein the driver profile may furthermore include further driver-related data. The driver profile may be stored in the vehicle itself, in a computer cloud, or in a divided environment, i.e., partly in the vehicle itself and partly in the computer cloud, wherein the vehicle and the computer cloud may be in an operative connection with one another via signal technology for the purpose of data transmission.

The driver may be informed about his or her performance, for example, by displaying a corresponding graphical depic-tion on a display device of the vehicle or a mobile terminal of the driver.

Optionally, it may be provided that criteria for determin-ing the performance are predefinable, for example, by the manufacturer of the vehicle, wherein the driver is informed with respect to these criteria. For example, it may be provided as a criterion that the steering action is not jerky during the takeover. Non-jerky acceleration of the vehicle during takeover may be provided as a further criterion. A further possible criterion would be to pay sufficient attention to the vehicle's surroundings during the takeover, for which the driver should first look into all vehicle mirrors in order to gain a better understanding of the surroundings.

The fulfillment of the previously defined criteria may be determined and taken into account in the practice results. In addition, these criteria and the related results may be broken down and visualized for the driver in order to inform said driver about exactly what needs to be considered during the takeover. Optionally, hints may be displayed on how fulfill-ment of the defined criteria can be achieved. For example, such a hint might read: "During a handover/takeover, please make sure to inspect each mirror first before you steer/ brake/ . . . ."

The driver's performance may be determined by means of various sensors and evaluation algorithms. For example, the driver may be observed by means of camera sensors.

The driver's performance may also be taken into account when planning subsequent practice sessions. In other words, the driver's performance may be taken into account when determining the minimum length of a subsection. If the driver's performance is below average, i.e., if the need for practice is comparatively high, the length of the subsection may be shortened so that takeover commands are generated and output more frequently for practice purposes. However, if the driver's performance is above average, the length of the subsection may be increased so that takeover commands for practice purposes are generated and output less often. It may be made possible to personalize the practice session.

According to further embodiment variants, the method may comprise a check of whether a successful takeover exists. In this case, there is no transition to a minimal-risk maneuver in the event of an unsuccessful takeover.

Since the takeover command is only a practice session, it is possible to dispense with the transition to minimal-risk maneuver, as is otherwise provided for in the event of a failed manual takeover of the vehicle. In other words, an unsuccessful practice session does not necessarily result in a transition to a minimal-risk maneuver, which could lead to annoyance of the driver and thus to lower acceptance of the entire practice method.

In order to rule out or at least reduce further risk to the driver, the vehicle, and its surroundings, the takeover command for practice purposes may be "overridable" by an actual takeover command due to the existence of a real takeover scenario. Thus, if a real takeover scenario occurs during the practice session, the practice session is aborted and replaced by the actual takeover scenario, which provides a transition to a minimal-risk maneuver in the event of a failed manual takeover.

A further aspect of the present disclosure relates to a system for practicing a manual takeover of vehicle control of a vehicle from an autonomous mode. The system comprises means which enable carrying out one of the above-described methods.

Therefore, the above embodiments for explaining the method according to the present disclosure also serve to describe the system according to the present disclosure. The advantages mentioned above with respect to the method are correspondingly associated with the system.

For example, the system may comprise a processing unit which is configured and arranged for generating a takeover command for performing the takeover of the vehicle control without the existence of a reason for takeover, and an output unit which is configured and arranged for outputting the takeover command to a driver of the vehicle without outputting information about the absence of a reason for takeover to the driver.

The processing unit may be configured to identify an autonomously drivable section of a driving route of the vehicle, to divide the autonomously drivable section into subsections, and to determine a current position of the vehicle along the driving route, wherein the takeover command is output when the next subsection is reached.

In addition, the processing unit may also be configured to determine and evaluate a driver's performance during the takeover, and/or to check whether a successful takeover has occurred.

The system may optionally comprise one or several sensors, a memory unit, and/or a display device.

A further aspect of the present disclosure relates to a vehicle comprising such a system.

The vehicle may preferably be configured as a passenger car or a truck. Further preferably, said vehicle is a vehicle of autonomy level 3.

Consequently, the embodiments for explaining the system according to the present disclosure also serve to describe the vehicle according to the present disclosure. The advantages mentioned with respect to the system are correspondingly associated with the vehicle.

A further aspect of the present disclosure relates to a computer program comprising instructions which, when the program is executed by a computer, cause said computer to carry out one of the methods described above.

Therefore, the above embodiments for explaining the method according to the present disclosure also serve to describe the computer program according to the present disclosure. The advantages mentioned above with respect to the method are correspondingly associated with the computer program.

A computer program may be understood to be program code which can be stored on a suitable medium and/or which can be retrieved via a suitable medium. Any medium which is suitable for storing software, for example, a non-volatile memory installed in a control unit, a DVD, a USB stick, a flash card, or the like, may be used for storing the program code. For example, the program code may be retrieved via the Internet or an intranet, or via another suitable wireless or wired network.

A further aspect of the present disclosure relates to a computer-readable data storage medium on which the computer program is stored.

BRIEF SUMMARY OF THE DRAWINGS

Further features, characteristics, and advantages of the present disclosure will be explained in greater detail below with the aid of exemplary embodiments, making reference to the attached figures. The following are shown.

DESCRIPTION

Figure 1:
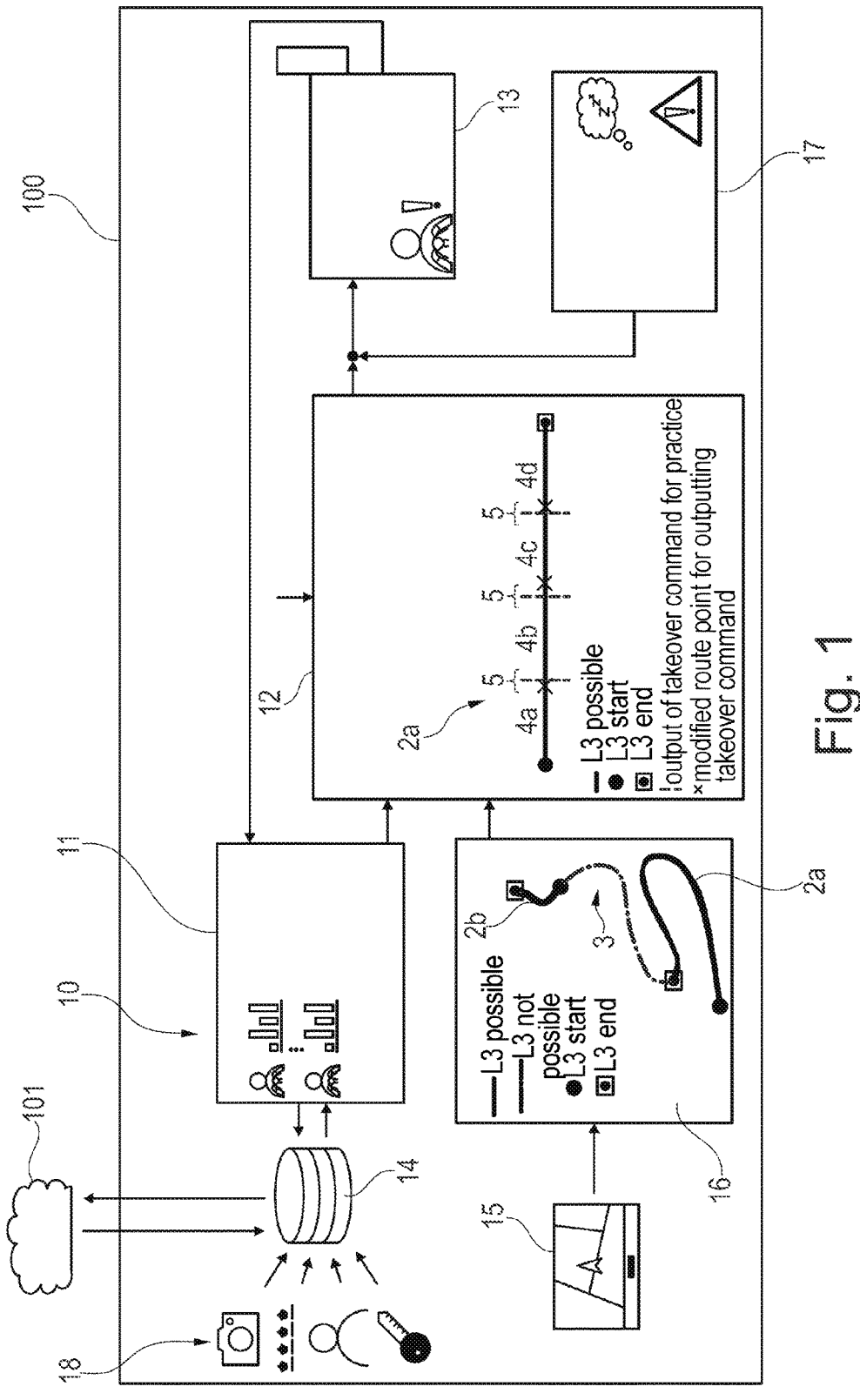
FIG. 1: a schematic representation of an exemplary vehicle.

FIG. 1 shows an exemplary vehicle 100 which, in the exemplary embodiment, is configured as a passenger car of autonomy level 3 (L3). Consequently, the vehicle 100 may be operated autonomously under certain conditions. However, in certain situations, a takeover of the control of the vehicle 100 by the driver is provided for.

The vehicle 100 comprises a system 10 which can be used to practice the sequence of such a takeover of the vehicle control of the vehicle 100 from an autonomous mode. The system 10 comprises several units to which one or several functions within the system 10 are assigned in each case. However, the distribution of the functions among the individual units may be also depicted differently than in FIG. 1, or units depicted individually in FIG. 1 may be combined to form a common unit.

The system 10 comprises a driver profile management unit 11. The driver profile management unit 11 manages driver profiles of various drivers and associated statistics, for example, with respect to the performance of a driver during a manual takeover of the vehicle control. The driver profile management unit 11 is in a data-transmitting operative connection with a memory unit 14 of the vehicle 100. Optionally, a computer cloud 101 may be provided, on which additional data may be stored outside the vehicle 100.

The memory unit 14 may cooperate with various identification devices 18 by means of which a particular driver can be identified, so that the driver profile associated with said driver can be selected and used. For example, the identification devices 18 may comprise a camera for facial recognition, an input device for entering a password or identification code or selection of a profile, a lock for a particular key, among other things.

The driver profiles managed by the driver profile management unit 11 may include, inter alia, a performance evaluation of the driver for manual takeovers which have already been completed. Such a performance evaluation may be taken into account when determining the minimum length of a subsection (see explanation below). The driver profile management unit 11 may transmit corresponding data to the processing unit 12.

In addition, the system 10 comprises a driving route analysis unit 16 which can interact with a navigation system 15 of the vehicle 100. A driving route 3 determined by the navigation system 15, for example, to a driving destination predefined by the driver starting from the current position of the vehicle 100, is transmitted to the driving route analysis unit 16. The driving route analysis unit 16 identifies autonomously drivable sections 2a, 2b of the driving route 3. For example, the driving route 3 shown in FIG. 1 by way of example comprises two autonomously drivable sections 2a, 2b according to autonomy level L3, between which there is a section on which it is not allowed to drive autonomously. The beginning of an autonomously drivable section 2a, 2b is depicted in FIG. 1 by a circle, and the end thereof is depicted by a square.

The driving route analysis unit 16 transmits the length of the currently driven autonomously drivable section 2a, 2b to the processing unit 12. This information is continuously updated and is correspondingly frequently retransmitted to the processing unit 12.

The processing unit 12 is used for scheduling, generating, and outputting takeover commands for practice purposes. For this purpose, the processing unit 12 divides the currently driven autonomously drivable section 2a into subsections 4a, 4b, 4c, 4d. Optionally, the subsections 4a, 4b, 4c, 4d may be of equal length, for example, the start or end points of the subsections 4a, 4b, 4c, 4d may be distributed equidistantly along the autonomously drivable section 2a, as shown in FIG. 1.

The number of subsections 4a, 4b, 4c, 4d, and consequently the length of each subsection 4a, 4b, 4c, 4d, depends on the driver profile which was transmitted from the driver profile management unit 11 to the processing unit 12. If the driver exhibits good performance during the manual takeover of the vehicle control according to his or her driver profile, the number of subsections 4a, 4b, 4c, 4d may be chosen to be rather small, whereas if the performance is poor, it may be chosen to be rather large.

The subsections may be determined, for example, as described below by way of example:

According to a previous practice session, it was determined that the driver should perform a manual takeover every 45 km in order to keep his or her attention. The length of the autonomously drivable section 2a, 2b is 100 km.

In a first variant, a first practice takeover takes place after 45 km, and a second practice takeover takes place after 90 km. A further takeover due to the end of the route of the autonomously drivable section 2a, 2b takes place after 100 km. This variant advantageously has a simple calculation algorithm. However, the takeovers which follow one another in quick succession at 90 km and 100 km are disadvantageous, and could result in annoyance to the driver and consequently lower acceptance of the proposed method 1.

In a second variant, a number of takeovers to be performed is determined based on the length of the autonomously drivable section 2a, 2b of 100 km and the predefined minimum length of a subsection 4a, 4b, 4c, 4d of 45 km, i.e., the number of takeovers is 100 km/45 km=2.22.

The determined number of 2.22 may then be rounded up or down. Rounding down results in two takeovers, i.e., one takeover at the end of the autonomously drivable section 2a, 2b, and one takeover for practice purposes, i.e., the first practice takeover after 50 km, and the second takeover because of the end of the route after 100 km.

Rounding up results in three takeovers, i.e., one takeover at the end of the autonomously drivable section 2a, 2b, and two takeovers for practice purposes, i.e., the first practice takeover after 33 km, the second practice takeover after 66 km, and the third takeover because of the end of the route after 100 km.

The rounding up and down may contribute to increased acceptance of the proposed method, since it is possible to avoid takeovers which follow one another in quick succession.

While the driving route is being completed, the processing unit 12 may track the progress along the subsections 4a, 4b, 4c, 4d by transmitting corresponding position data from the driving route analysis unit 16. When the next subsection 4a, 4b, 4c, 4d is reached, as indicated in FIG. 1 by a vertical line, the processing unit 12 generates a takeover command for performing the manual takeover of the vehicle control and outputs said command to the driver by means of the output unit 13. The driver is not informed that it is a practice session. Optionally, the takeover command may be output randomly within a distance window 5 before and after reaching the next subsection 4a, 4b, 4c, 4d. This is marked in FIG. 1 by crosses.

In addition to takeover commands for practice purposes, the processing unit 12 also generates takeover commands based on the existence of a schedulable takeover scenario, i.e., the scheduled occurrence of a reason for takeover. For example, such a takeover command is generated by the processing unit 12 at the end of an autonomously drivable section 2a, 2b, since manual control of the vehicle 100 is subsequently required. Optionally, advance notice may be output to the driver in this case, since it is a schedulable takeover.

In addition, unscheduled takeovers 17 may also be necessary, for example, in the case of a system failure, sudden changes in weather, detected driver inattention, etc.

All takeover commands are output to the driver by means of the output unit 13, which, for example, may be configured as a display. The output simultaneously initiates the determination and evaluation of the driver's performance during the takeover, and a check of whether the takeover is successful. For example, it may be detected how long it takes the driver to direct his or her eyes to the roadway ahead of the vehicle 100, perform certain actions, and possibly how regularly the required actions are performed. After the takeover, the corresponding data are transmitted to the driver profile management unit 11, so that the relevant driver profile can be updated. In addition, a signal is output to the processing unit 12 for resetting, so that the described practice process can be performed again.

If the manual takeover does not proceed successfully during a practice session, there is no transition to a minimal-risk maneuver, unlike in the case of a mandatory takeover due to the existence of a takeover scenario. If a takeover is absolutely mandatory during a practice session, the practice method is aborted and overridden by the takeover command which is required therefor.

Figure 2:
FIG. 2: a flow chart of an exemplary method.
Figure 2:
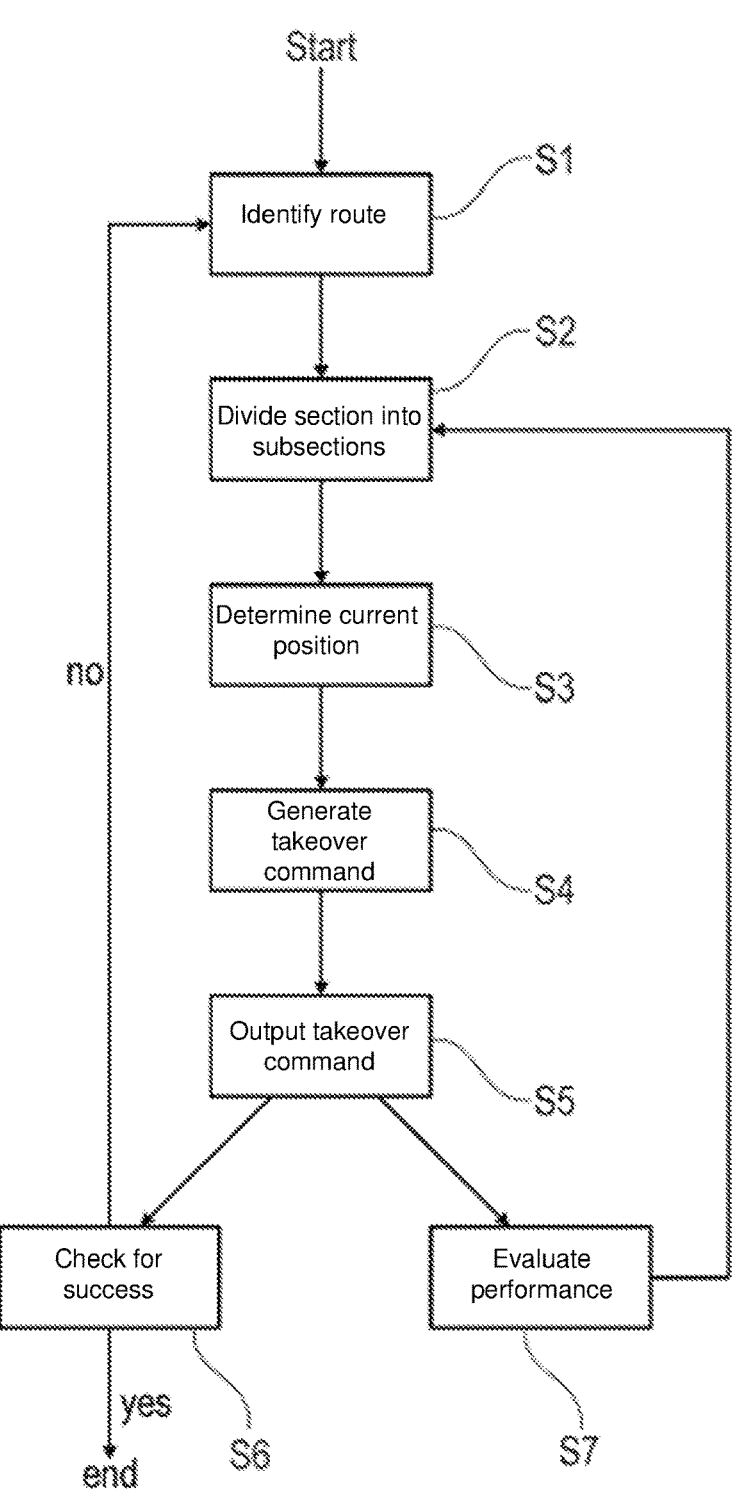

FIG. 2 shows a flow chart of an exemplary method 1. The method 1 may be carried out, for example, by means of the system 10 or vehicle 100 explained above with reference to FIG. 1.

Following the start of the method, in a first method step S1, an autonomously drivable section 2a, 2b of the driving route 3 of the vehicle 100 is identified. Subsequently, in method step S2, this autonomously drivable section 2a, 2b is divided into subsections 4a, 4b, 4c, 4d.

In method step S3, the current position of the vehicle 100 along the driving route 3 is determined, for example, by means of a navigation satellite system. In the following method step S4, a takeover command for performing the takeover of the vehicle control is generated, wherein no reason for takeover exists, i.e., it is a takeover command for practice purposes. In method step S5, this takeover command is output to the driver of the vehicle 100 upon reaching the next subsection 4a, 4b, 4c, 4d. Optionally, it is possible to output the takeover command not exactly upon reaching the next subsection 4a, 4b, 4c, 4d, but within a predefinable distance window or time window 5 before and after reaching the next subsection 4a, 4b, 4c, 4d.

In method step S6, a check is made to determine whether the manual takeover of the vehicle control has been successful. If this is the case, the method ends. However, if this is not the case, the method is continued with method step S1. In the case of an unsuccessful takeover, no transition to a minimal-risk maneuver is provided.

In parallel with method step S6, method step S7 is carried out, during which the driver's performance during the manual takeover of the vehicle control is determined and evaluated. Corresponding performance data may then be used in a renewed method 1 in method step S2 when subdividing the autonomously drivable section 2a, 2b into subsections 4a, 4b, 4c, 4d, by taking the driver's performance into account when determining the minimum length of a subsection 4a, 4b, 4c, 4d.

Overall, by means of the proposed method and system, takeovers of the vehicle control for practice purposes may be carried out in addition to takeovers for actual reasons for takeover. Failed practice takeovers preferably do not result in a transition to a minimal-risk driving maneuver. However, the practice mode may be "overridable" by an actually-required takeover, in the scope of which a transition to a minimal-risk maneuver takes place as usual in the case of a failed takeover.

Each takeover process may be evaluated, i.e., the driver's performance during the takeover of the vehicle control may be determined. Corresponding evaluations, for example, in the form of statistics, may be presented to the driver. The practice schedule, i.e., the frequency of the takeover of the vehicle control for practice purposes, may be set up as a function of the previously achieved performance of the driver, so that, for example, inexperienced drivers complete a practice session more frequently.

LIST OF REFERENCE SIGNS

1 Method
2a, 2b Autonomously drivable section
3 Driving route
4a, 4b, 4c, 4d Subsection
5 Distance window
10 System
11 Driver profile management unit
12 Processing unit
13 Output unit
14 Memory unit
15 Navigation system
16 Driving route analysis unit
17 Unscheduled takeover
18 Identification device
100 Vehicle
101 Computer cloud
L3 Autonomy level 3
S1 to S7 Method steps

The invention claimed is:

1. A computer comprising instructions that, when executed by the computer, cause the computer to:

identify an autonomously drivable section of a driving route of a vehicle in which the vehicle is permitted to operate in an autonomous mode;

subdivide the autonomously drivable section into subsections;

determine a number of subsections based on a length of the autonomously drivable section and a predefinable minimum length of the respective subsections;

determine a current position of the vehicle along the driving route;

while operating the vehicle in the autonomous mode, generate a takeover command for a driver of the vehicle upon completion of at least one of a predefinable driving distance and a predefinable driving time by the vehicle operating along the driving route;

wherein the takeover command is output upon reaching a next subsection within the autonomously drivable section; and output the takeover command to the driver of the vehicle.

2. The computer of claim 1, the instructions further including instructions to output the takeover command randomly within a predefinable distance window or time window before and after reaching the next subsection.

3. The computer of claim 1, the instructions further including instructions to evaluate the driver's performance during the takeover.

4. The computer of claim 1, wherein the driver's performance is taken into account when determining the minimum length of a subsection.

5. A method, comprising:

identifying an autonomously drivable section of a driving route of the vehicle in which the vehicle is permitted to operate in an autonomous mode;

subdividing the autonomously drivable section into subsections;

determining a number of subsections based on a length of the autonomously drivable section and a predefinable minimum length of the respective subsections;

determining a current position of the vehicle along the driving route;

while operating the vehicle in the autonomous mode, generating a takeover command for a driver of the vehicle upon completion of at least one of a predefinable driving distance and a predefinable driving time by the vehicle operating along the driving route;

wherein the takeover command is output upon reaching a next subsection within the autonomously drivable section; and outputting the takeover command to the driver of the vehicle.

6. The method of claim 5, further comprising outputting the takeover command randomly within a predefinable distance window or time window before and after reaching the next subsection.

7. The method of claim 5, further comprising evaluating the driver's performance during the takeover.

8. The method of claim 5, wherein the driver's performance is taken into account when determining the minimum length of a subsection.

* * * * *